United States Patent [19]
Doi et al.

[11] Patent Number: 5,670,987
[45] Date of Patent: Sep. 23, 1997

[54] VIRTUAL MANIPULATING APPARATUS AND METHOD

[75] Inventors: Miwako Doi, Kawasaki; Nobuko Kato, Yokohama; Naoko Umeki, Kawasaki, all of Japan

[73] Assignee: Kabushiki Kaisha Toshiba, Kawasaki, Japan

[21] Appl. No.: 612,076

[22] Filed: Mar. 7, 1996

Related U.S. Application Data

[63] Continuation of Ser. No. 308,415, Sep. 19, 1994, abandoned.

[30] Foreign Application Priority Data

Sep. 21, 1993 [JP] Japan .................................. 5-234372
Dec. 28, 1993 [JP] Japan .................................. 5-337416

[51] Int. Cl.[6] ........................................................ G09G 5/00
[52] U.S. Cl. ............................................. 345/156; 395/355
[58] Field of Search ................................ 325/156, 157, 325/158, 145, 146; 395/161, 355, 326

[56] References Cited

U.S. PATENT DOCUMENTS

| | | |
|---|---|---|
| 4,414,537 | 11/1983 | Grimer . |
| 4,988,981 | 1/1991 | Zimmerman et al. ............... 345/157 |
| 5,293,529 | 3/1994 | Yoshimura et al. ............... 345/158 |
| 5,381,158 | 1/1995 | Takahara et al. ............... 345/156 |

FOREIGN PATENT DOCUMENTS

| | | |
|---|---|---|
| 4-18626 | 1/1992 | Japan . |
| 2013617 | 8/1979 | United Kingdom . |

*Primary Examiner*—Regina D. Liang
*Attorney, Agent, or Firm*—Oblon, Spivak, McClelland, Maier & Neustadt, P.C.

[57] ABSTRACT

A manipulation target such as a lever or button is displayed in a three-dimensional virtual space using three-dimensional computer graphics. The positions of a thumb and an index finger are detected. A manipulation instruction is interpreted, using interpretation rules described on the basis of a relationship between the detected positions and the thumb and the index finger and the three-dimensional coordinates of a display device.

12 Claims, 23 Drawing Sheets

NOT GRASPED
GRASPED
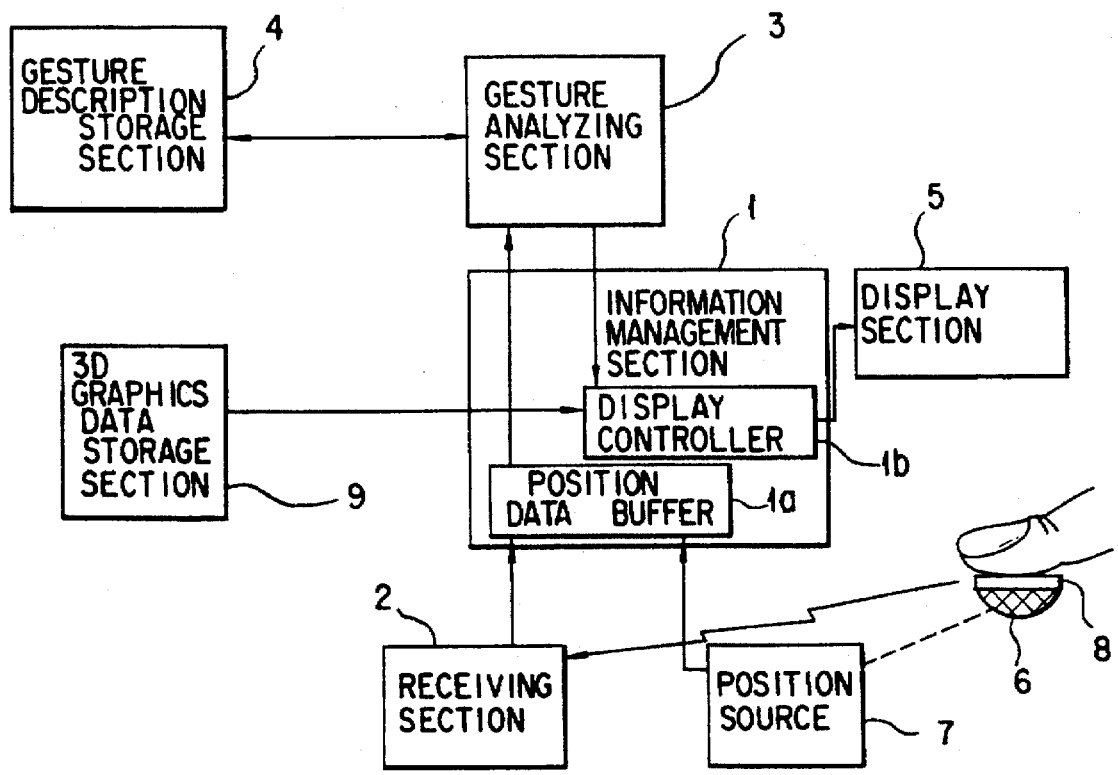
F I G. 3

| SENSOR NUMBER | x | y | z | roll $\alpha$ | pitch $\beta$ | yaw $\gamma$ |
|---|---|---|---|---|---|---|
| 1 | $x_1\uparrow$ | $y_1\uparrow$ | $z_1\uparrow$ | $\alpha_1\uparrow$ | $\beta_1\uparrow$ | $\gamma_1\uparrow$ |
| 2 | $x_2\uparrow$ | $y_2\uparrow$ | $z_2\uparrow$ | $\alpha_2\uparrow$ | $\beta_2\uparrow$ | $\gamma_2\uparrow$ |

RULE 1:

$\left(\begin{array}{l}\text{if } Lt \leq \Delta 1 \, \&, \, h\_gesture \neq Grasp \, \& \, h\_gesture \neq Slide \\ \quad \& \, y2t > y1t \\ \quad \text{then } h\_gesture = Grasp\end{array}\right.$

RULE 2:

$\left(\begin{array}{l}\text{if } Lt > 2\Delta, \, \& \, (h\_gesture == Grasp \, | \, h\_gesture == Slide) \\ \quad \text{then } h\_gesture = Release\end{array}\right.$

RULE 3:

$\left(\begin{array}{l}\text{if } Lt \leq \Delta, \, \& \, (h\_gesture == Grasp \, | \, h\_gesture == Slide) \\ \quad \text{then } h\_gesture = Slide\end{array}\right.$

RULE 4:

$\left(\begin{array}{l}\text{if } Lt > \Delta 2 \, \& \, h\_gesture == Release \\ \quad \text{then } h\_gesture = Neutral\end{array}\right.$ NOTE: $Lt = \sqrt{(x1t - x2t)^2 + (y1t - y2t)^2 + (z1t - z2t)^2}$ $\Delta it = \sqrt{(xit - xit-1)^2 + (yit - yit-1)^2 + (zit - zit-1)^2}$ $(i = 1, 2)$

F I G. 6

RULE 5:

if $Lt > 2\Delta t$ & $|\sin\theta t| \leq \Delta t$

& $y2t > y1t$ then h_gesture = Point

REMARKS; →

$qi = (Si, (Vxi, Vyi, Vzi))$ $(i=1,2)$ $\overline{ai} = \overline{qi}^{-1} ((0,0,1) \times \overline{qi})$ $= (-2Si \, Vyi + 2Vxi \, Vyi,$ $\quad 2Si \, Vxi - 2Vyi \, Vzi,$ $\quad Si^2 + Vzi^2 - Vxi^2 - Vyi^2) /$ $\quad (Si^2 + Vxi^2 + Vyi^2 + Vzi^2)$ $\sin\theta = \overline{a1} \cdot \overline{a2}$ $Si = \cos\dfrac{ai}{2}\cos\dfrac{\beta i}{2}\cos\dfrac{\gamma i}{2} + \sin\dfrac{ai}{2}\sin\dfrac{\beta i}{2}\sin\dfrac{\gamma i}{2}$ $Vxi = \sin\dfrac{ai}{2}\cos\dfrac{\beta i}{2}\cos\dfrac{\gamma i}{2} \cos\dfrac{ai}{2}\sin\dfrac{\beta i}{2}\sin\dfrac{\gamma i}{2}$ $Vyi = \cos\dfrac{ai}{2}\sin\dfrac{\beta i}{2}\cos\dfrac{\gamma i}{2} \sin\dfrac{ai}{2}\cos\dfrac{\beta i}{2} + \dfrac{\gamma i}{2}$ $Vzi = \cos\dfrac{ai}{2}\cos\dfrac{\beta i}{2}\sin\dfrac{\gamma i}{2} \sin\dfrac{ai}{2}\sin\dfrac{\beta i}{2}\cos\dfrac{\gamma i}{2}$

F I G. 7

RULE 6 ;

if $-Lt < 2\Delta$, & h_gesture == point
then h_gesture = Neutral

RULE 7 ;

if $L2t \leq \Delta 1$ & ( h_gesture == Point
    h_gesture == Touch )
then h_gesture = Touch REMARKS : $L2t = \sqrt{(x2t-xd)^2 + (y2t-yd)^2 + (z2t-zd)^2}$ (xd, yd, zd) REPRESENTS POSITION COORDINATES OF DISPLAY

RULE 8 ;

if $L2t > 2\Delta$, & h_gesture == Touch
then h_gesture = Release

F I G. 8

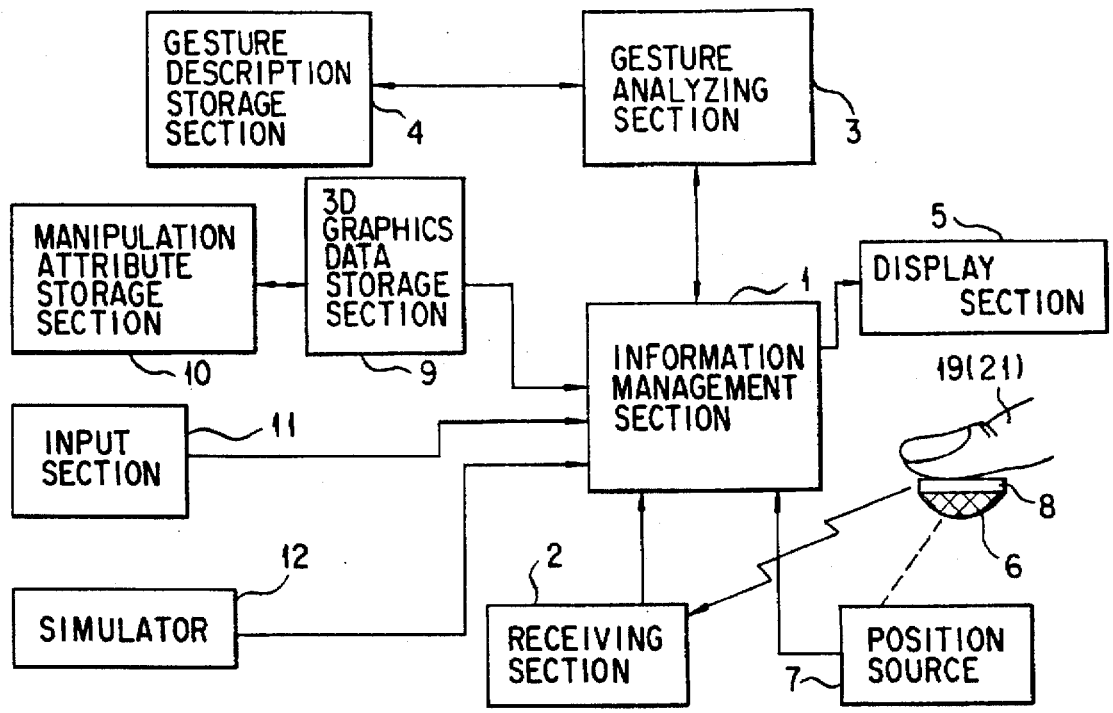
F I G. 11
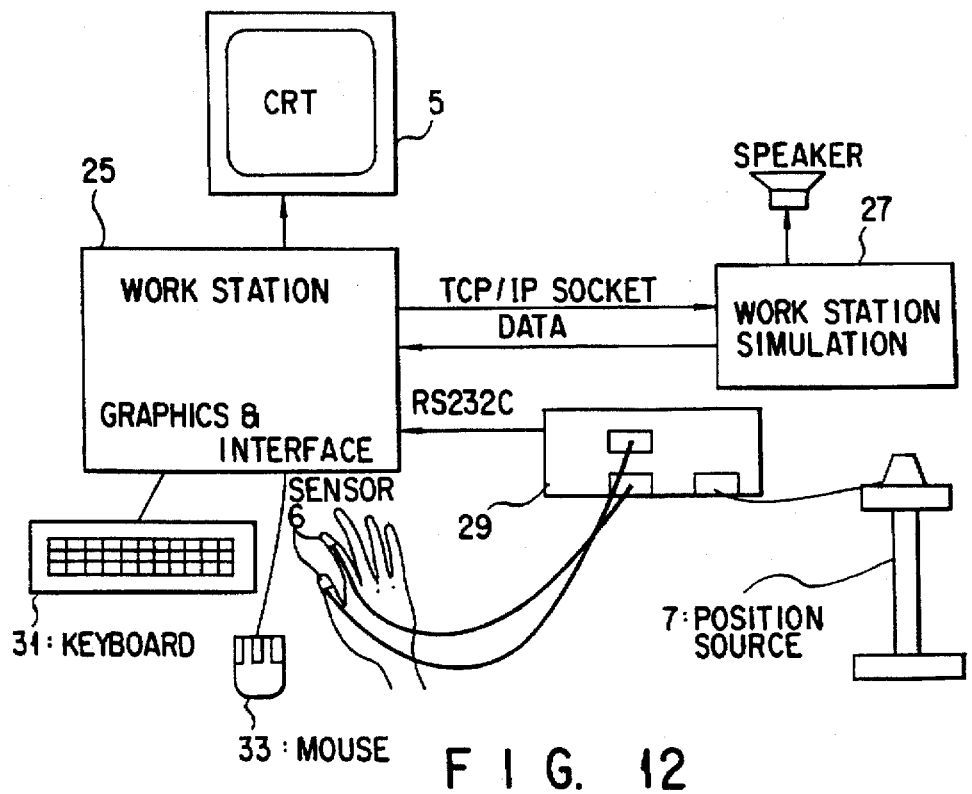
F I G. 12

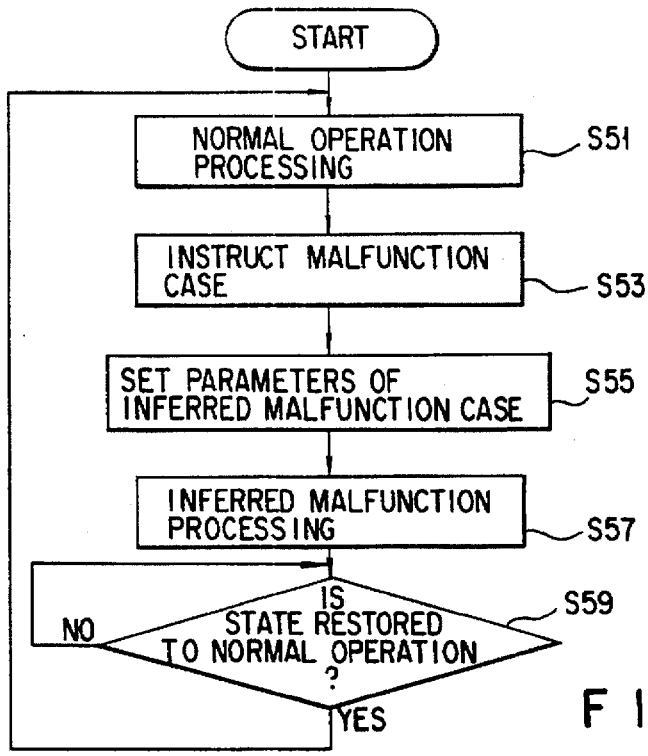
F I G. 13
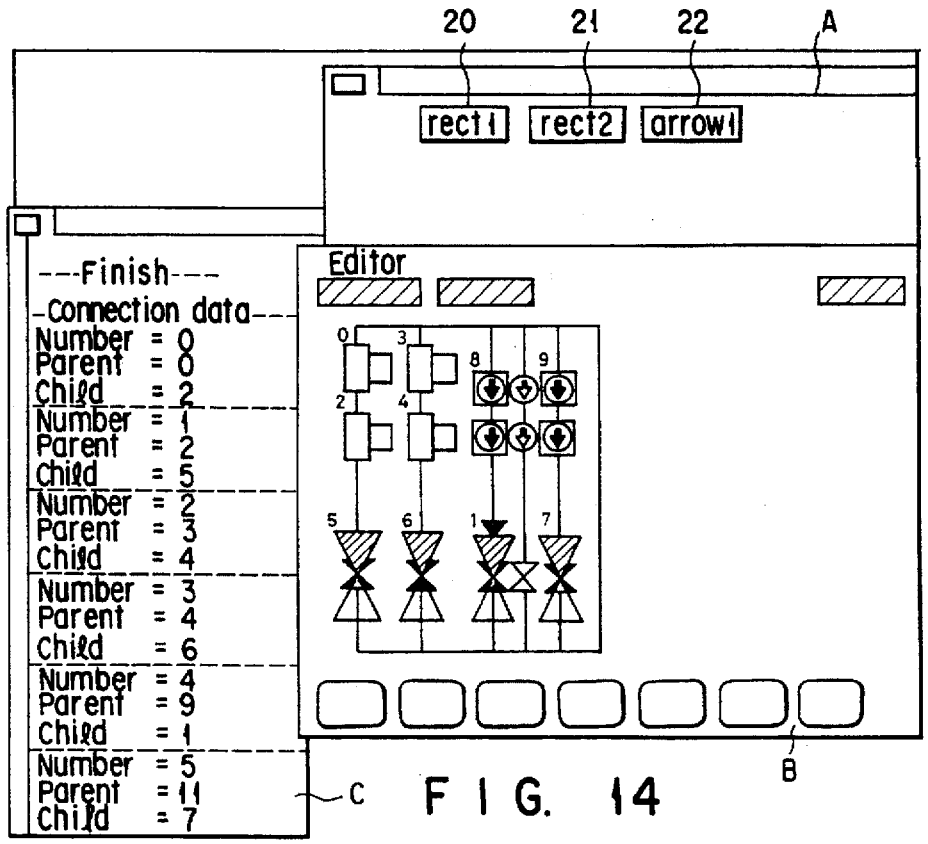
F I G. 14

DEFINITION OF ATTRIBUTE. C o SELECTION OF OBJECT
    CLICK LEFT MOUSE BUTTON o SET NEW ATTRIBUTE DATA TO SELECTED OBJECT

1   DEPRESS "N"

2   SELECT OBJECT BY CLICKING LEFT MOUSE BUTTON

3   SELECT ATTRIBUTE FROM WINDOW MENU BY
       CLICKING RIGHT MOUSE BUTTON

4   SET DATA INTERACTIVELY o DELETE ATTRIBUTE DATA OF SELECTED OBJECT

1   DEPRESS "D"

2   SELECT OBJECT BY CLICKING LEFT MOUSE BUTTON
       — DELETED o COPY EXISTING ATTRIBUTE DATA

1   DEPRESS "C"

2   SELECT OBJECT HAVING DATA TO BE COPIED
       BY CLICKING LEFT MOUSE BUTTON
    3   SELECT DESTINATION OBJECT BY CLICKING MIDDLE
       MOUSE BUTTON o VIEW ATTRIBUTE DATA WHICH HAVE ALREADY BEEN SET
  DEPRESS "S"

o WRITE ALL SET DATA IN FILE
  DEPRESS "W"

o END
  SELECT MENU BY ESCAPE KEY OR RIGHT MOUSE BUTTON

FIG. 15A

DEFINITION OF CONNECTION.C

○ SET PARENT - CHILD RELATION BETWEEN OBJECTS

1   SELECT PARENT BY CLICKING LEFT MOUSE BUTTON

2   SELECT CHILD BY CLICKING MIDDLE MOUSE BUTTON

NOTE: PARENT CAN HAVE ANY NUMBER OF CHILDREN BUT CHILD CAN BELONG TO ONLY ONE PARENT

○ DELETE CONNECTION DATA

1   DEPRESS "o"

2   SELECT OBJECT BY CLICKING LEFT MOUSE BUTTON

— IF CONNECTION DATA HAS ONLY CHILD DATA, CHILD DATA IS DELETED

— IF CONNECTION DATA HAS ONLY PARENT DATA, NO DELETION IS PERFORMED

— IF CONNECTION DATA HAS BOTH PARENT DATA AND CHILD DATA, ONLY CHILD DATA IS DELETED

○ WRITE ALL SET DATA IN FILE

DEPRESS "w"

○ END

SELECT MENU BY ESCAPE KEY OR RIGHT MOUSE BUTTON

F I G. 15B

| Object Position Data in Operation Room | POSITION DATA TABLE |
|---|---|
| ## ## <br> i      0 <br> o     11 <br> a      0 <br> p 90.19, 0.00, 166.53 <br> r    0,   0,   0 | i: ID NUMBER OF POSITION DATA |
| i      1 <br> o     12 <br> a      1 <br> p 350.35, 0.00, 591.72 <br> r    0,   0,   0 | o: ID NUMBER OF OBJECT SHAPE DATA |
| i      2 <br> o     11 <br> a      0 <br> p 91.92, 0.00, 320.66 <br> r    0,   0,   0 | a: ID OF ATTRIBUTE DATA <br><br> p: x, y, z COORDINATES |
| i      3 <br> o     11 <br> a      0 <br> p 222.01, 0.00, 168.30 <br> r    0,   0,   0 | r: ROTATIONAL ANGLE AROUND x, y, z AXES |
| i      4 <br> o     11 <br> a      0 <br> p 223.74, 0.00, 320.66 <br> r    0,   0,   0 | ATTRIBUTE ID DATA IS ADDED TO MEMBER OF EXISTING POSITION DATA |
| i      5 <br> o     12 <br> a      1 <br> p 64.17, 0.00, 577.55 <br> r    0,   0,   0 | |
| i      6 <br> o     12 <br> a      1 <br> p 197.72, 0.00, 581.09 <br> r    0,   0,   0 | |

```
Object Attribute Data
ATTRIBUTE DATA

ATT_ID :            <- ID NUMBER OF ATTRIBUTE DATA
CLASS  :            <- TYPE OF ATTRIBUTE 0:LEVEL
                       1:BUTTON 2:PANEL

LEVER
CLASS  :            <- LEVER
Axis   :            <- ROTATION AXIS 1:x 2:y 3:z
Num_of_Gears        <- NUMBER OF GEARS
Range  :            <- RANGE OF GEAR POSITIONS (DEGREE)
Gear-Position       <- CENTER OF GEAR POSITION
Sound_file_No:      <- SOUND NUMBER BUTTON
On_Position:        <- BUTTON COORDINATES IN ON POSITION
On_Color:           <- BUTTON COLOR IN ON POSITION
Off_Color:          <- BUTTON COLOR IN OFF POSITION
Sound_file_No:      <- SOUND NUMBER PANEL
On_color :          <- COLOR OF PANEL WHEN ON
Off_Color:          <- COLOR OF PANEL WHEN OFF
```

```
ATT_ID : 0
CLASS : 0#(null)
Axis :          0 # ((null))
Num_of_Gears :2
Range :         30
Gear-Position: 60 120
Sound_file_No: 9

ATT_ID : 1
CLASS :  2 # ((null))
On_Color :   230 120 150
Off_Color :  200 200 100

ATT_ID : 2
CLASS :  1 # ((null))
On_Position:  120.000000
On_Color :    256 0 0
Off_Color :   200 200 200
Sound_file_No : 4
```

F I G. 17

```
Object Connection Data

SUBORDINATION DATA FILE

NUMBER   connection data number
PARENT   parent object position_id
CHILD    child object position_id
```

```
NUMBER : 0      <- ID NUMBER OF SUBORDINATION DATA
PARENT : 0      <- PARENT POSITION ID
CHILD  : 2      <- CHILD POSITION ID

NUMBER : 1
PARENT : 2
CHILD  : 5

NUMBER : 2
PARENT : 3
CHILD  : 4

NUMBER : 3
PARENT : 4
CHILD  : 6

NUMBER : 4
PARENT : 9
CHILD  : 1

NUMBER : 5
PARENT : 11
CHILD  : 7
```

F I G. 18

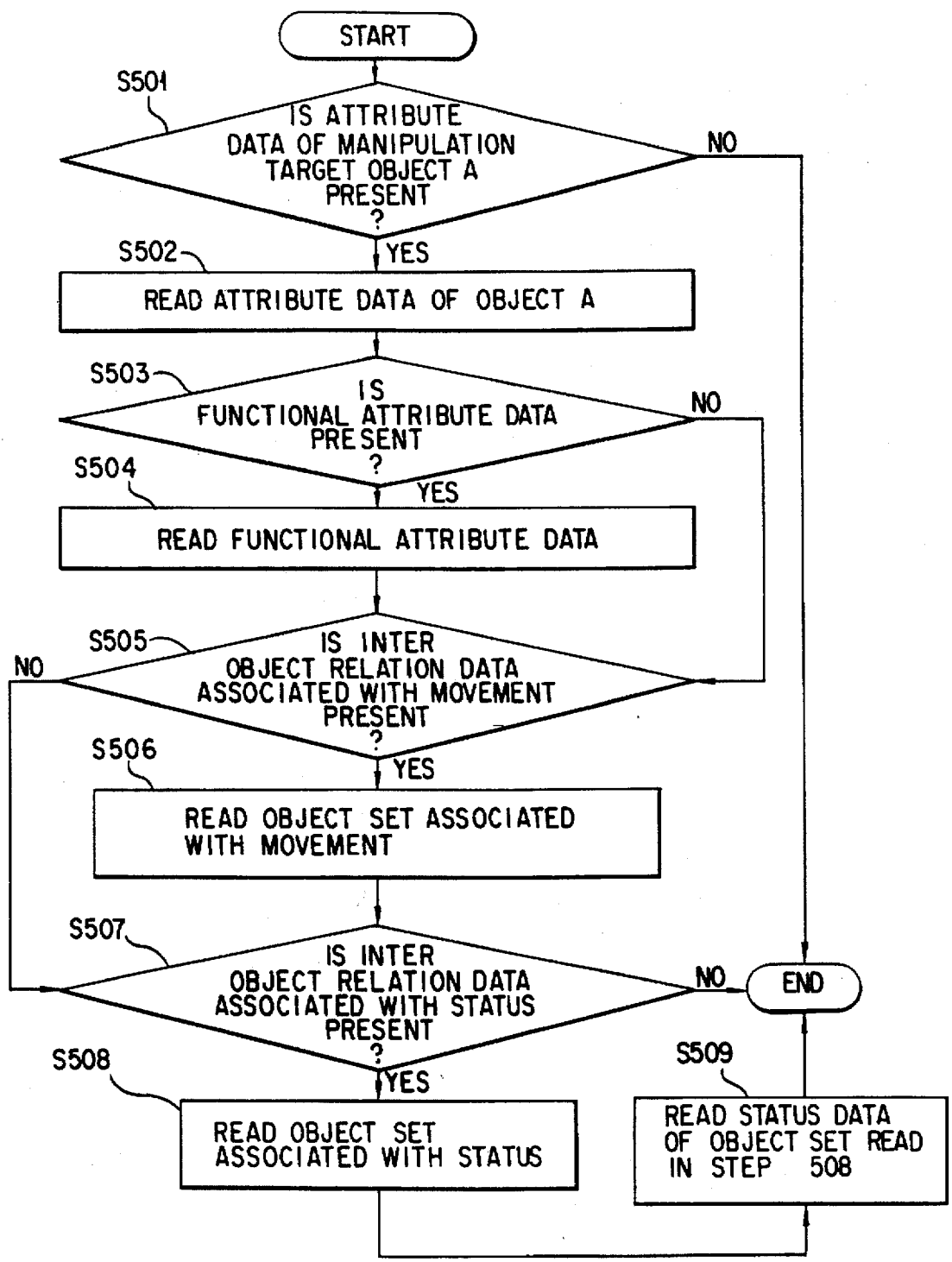
F I G. 21

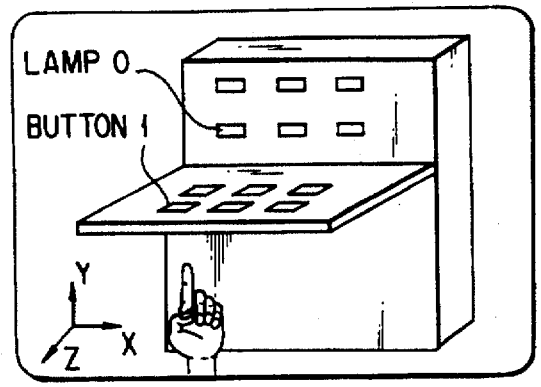

FIG. 23A

OBJECT ATTRIBUTE STORAGE SECTION

| ATTRIBUTE DATA | ---- | 1 | ---- |
|---|---|---|---|
| TYPE OF OPERATIONS | ---- | PARALLEL MOVEMENT | ---- |
| OPERATIONAL RANGE | ---- | 5cm | ---- |
| OPERATIONAL DIRECTION | ---- | (0.0, 1.0, 0.0) | ---- |
| FUNCTIONAL ATTRIBUTE DATA ID | ---- | 1 | ---- |

FIG. 23B

OBJECT POSITION STORAGE SECTION

| ID NUMBER | 0 | 1 | ---- |
|---|---|---|---|
| OBJECT SHAPE DATA NUMBER | 120 | 130 | ---- |
| POSITION COORDINATES | (X0,Y0,Z0) | (X1,Y1,Z1) | ---- |
| ROTATIONAL ANGLE | (90,0,0) | (0,0,0) | ---- |
| ATTRIBUTE DATA | 2 | 1 | ---- |

FIG. 23C

| FUNCTIONAL ATTRIBUTE ID DATA | ---- | 1 | ---- |
|---|---|---|---|
| TYPE OF FUNCTIONS | ---- | BUTTON | ---- |
| ON COLOR | ---- | (250, 0, 0) | ---- |
| OFF COLOR | ---- | (0, 250, 0) | ---- |
| SOUND | ---- | "CLICK" | ---- |

FIG. 23D

FUNCTIONAL ATTRIBUTE TABLE

| MOTION | | STATUS | |
|---|---|---|---|
| PARENT | CHILD | PARENT | CHILD |
| ⋮ | ⋮ | ⋮ | ⋮ |
| NULL | NULL | 1 | 0 |
| ⋮ | ⋮ | ⋮ | ⋮ |
INTER OBJECT RELATION STORAGE SECTION
F I G. 23E
OBJECT STATUS STORAGE SECTION
| ID NUMBER | ON/OFF |
|---|---|
| 0 | OFF |
| 1 | OFF |
| ⋮ | ⋮ |
F I G. 23F
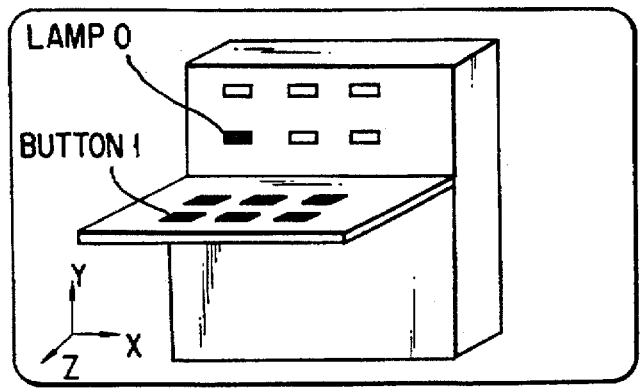
F I G. 23G

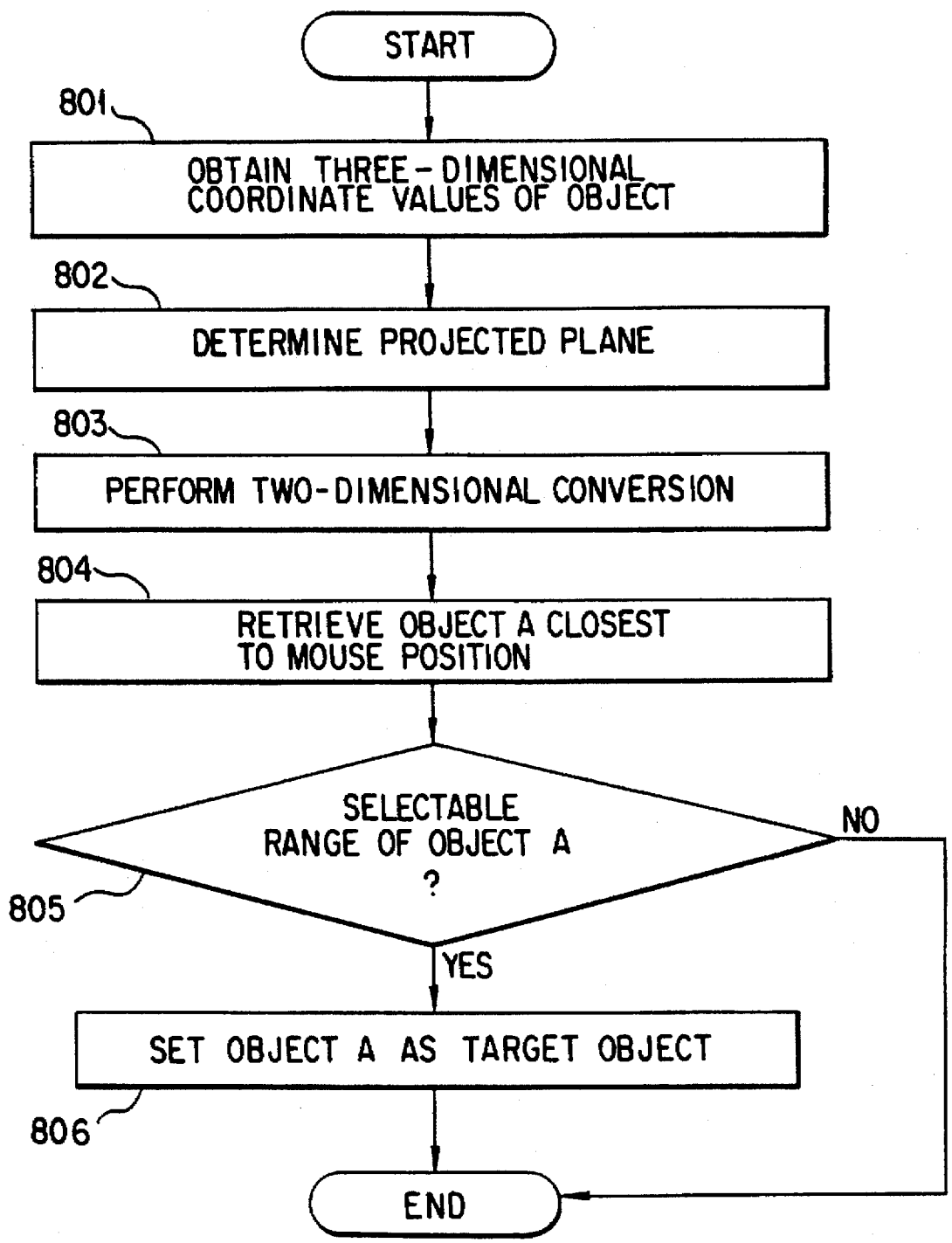
F I G. 25

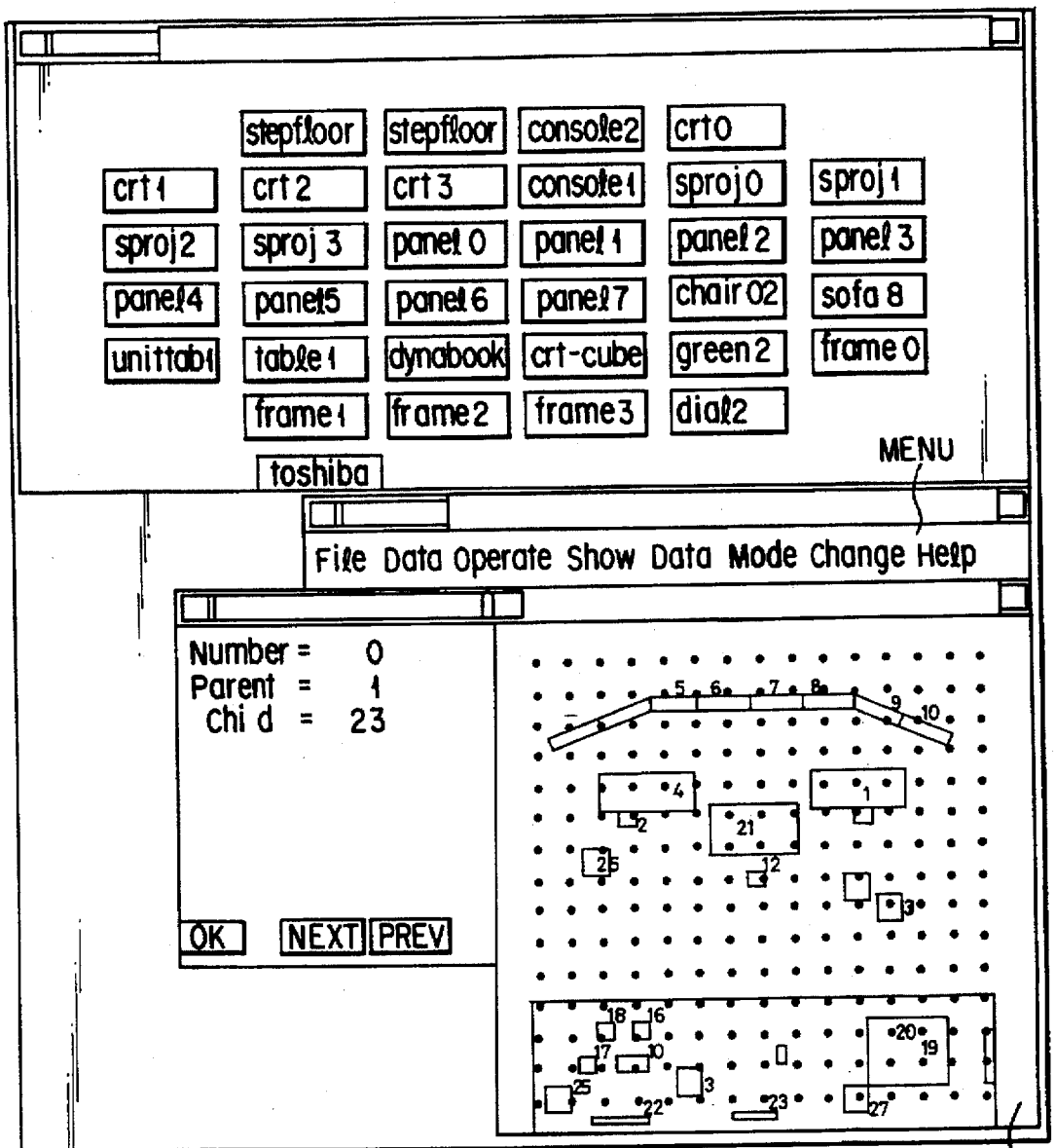
F I G. 26
TWO-DIMENSIONAL VIRTUAL SPACE DISPLAY

VIRTUAL MANIPULATING APPARATUS AND METHOD

This application is a continuation of application Ser. No. 08/308,415, filed on Sep. 19, 1994, now abandoned.

BACKGROUND OF THE INVENTION

1. Field of the Invention

The present invention relates to a virtual manipulating apparatus and method for naturally manipulating a manipulation target present in a virtual space created inside a computer.

2. Description of the Related Art

Computers have been introduced to automate monitor and control operations in power plants and factories. In a normal operation state, almost no operations are required for operators. The main work of the operator is to check the monitor screen of a monitor or control panel. However, training for a measure against an accident, using a trainer, has been performed in case of an emergency. The trainer has the same housing as that of a real machine used for actual control and monitoring, but software in the trainer is replaced as a simulator for simulating an accidental phenomenon. The operator uses the trainer to input, with levers and buttons, instructions corresponding to an accidental phenomenon presented by the simulator. In this manner, an existing trainer undesirably requires the same cost and installation space as those of the real machine.

To solve this problem, there is a method of operating an accidental phenomenon simulator on a workstation or personal computer and simulating the monitor screen of a control or monitor panel on the screen of the workstation or personal computer. According to this method, an operator touches the screen through a touch screen to select a menu to input an instruction. In this case, the menu is selected with a pointing device such as a mouse to simulate the accidental phenomenon. A manipulation for inputting an instruction by another means except for the touch screen or pointing device, e.g., a manipulating method for inputting an instruction with a lever or button on a panel cannot perfectly simulate the accidental phenomenon because the simulation uses only a two-dimensional Graphical User Interface (GUI).

To solve the problem posed by such a two-dimensional simulation, a three-dimensional computer graphics (CG) method using a virtual reality (VR) constituting a three-dimensional space including a virtual trainer and the like in a computer is under examination. An input device for instructing three-dimensional position coordinates for a manipulation target in the three-dimensional space in the VR is used because the manipulation target is present in a three-dimensional space as in reality.

The three-dimensional position input devices include a magnetic sensor type input device for detecting only a three-dimensional position (e.g., a 3D Space Isotrack available from Polhemus and a Bird available from Ascension Technology), an ultrasonic sensor type input device available from Honeywell, and an optical input device for recognizing LED light. These devices, however, require other buttons for selecting, e.g., a menu because these devices only detect three-dimensional positions.

Three-dimensional input devices capable of instructing a menu in addition to detection of three-dimensional position coordinates include a DataGlove (available from VPL; this glove input device measures the bending angles of finger joints with optical fibers) capable of identifying the gesture of a hand and a CyberGlove (available from Cyber; this glove input device is embedded with special resistors to measure the bending angles of finger joints). These devices, however, are expensive. In addition, calibration is required in use of the input device, thereby complicating the input manipulations. When a trainer is assumed, lever and button manipulations are achieved by giving two-dimensional displacement with respect to the lever and button arranged in the three-dimensional space. For this reason, an input device for inputting a three-dimensional gesture, such as the DataGlove and CyberGlove is beyond the specifications. More specifically, these three-dimensional input devices have limitations on response time and the recognition precision of gestures and cannot accurately perform manipulations equivalent to lever and button manipulations, undesirably resulting in high cost performance. For example, recognition has been performed by defining an artificial gesture representing a pointing state corresponding to a specific bending angle of a finger joint. In other words, manipulations such as "Grasp", "Slide", "Point", "Touch", and "Release" are tried to be defined using only angle information of the finger joints, but it was difficult. For example, FIG. 1 shows a state in which a manipulation target is not grasped with fingers, while FIG. 2 shows a state in which the manipulation target is grasped with the fingers. The DataGlove determines the states in FIGS. 1 and 2 as the grasped states because each angle of a joint of the thumb and index finger is not changed in the states in FIGS. 1 and 2. Therefore, manipulations such as lever and button manipulations cannot be accurately performed. For this reason, in order to recognize the difference between the states in FIGS. 1 and 2, the gesture must be interpreted in accordance with positions of fingertips.

SUMMARY OF THE INVENTION

It is an object of the present invention to provide a virtual manipulating apparatus and method capable of naturally and accurately performing lever and button manipulations and touch screen manipulations in a three-dimensional virtual space at high speed.

In order to achieve the above object, according to the virtual manipulating apparatus and method of the present invention, manipulation targets such as levers and buttons are presented by creating a three-dimensional virtual space using the three-dimensional CG, positions of a thumb and an index finger are detected, and a specific manipulation is interpreted by described interpretation rules on the basis of three coordinate positions, i.e., the detected thumb and index finger positions and the manipulation target position.

When the present invention constitutes a virtual trainer, an accidental phenomenon and the internal state of a training object system associated with the accidental phenomenon are simulated. The manipulation target such as a lever or button has a predetermined movable range. This range is stored as a possible manipulation attribute together with three-dimensional CG data. The interpreted manipulation instruction is transmitted to perform information management such that an arithmetic manipulation result of the simulator is presented.

To improve interpretation efficiency and accuracy, interpretation rules are described to interpret a manipulation instruction on the basis of the detected thumb and index finger positions, the manipulation target position, and the stored manipulation attributes.

According to the virtual manipulating apparatus and method of the present invention, when two-dimensional manipulations such as manipulations using a lever, a button, a touch screen, and a slider are to be performed in the three-dimensional space, an operator's gesture is interpreted from the rules described on the basis of a positional relationship between the thumb and index finger positions and the manipulation target position.

To improve accuracy, the ways of moving the manipulation targets such as a lever, a button, and a touch screen are limited, and an interpreting means interprets the instruction of an operator's gesture on the basis of the interpreting rules with the attributes as the ways of movements. The ways of movements of the manipulation targets are limited as follows. For example, the moving range is limited for a slider, the rotational direction and rotational range are limited for a lever, the depression stroke is limited for a button, and the position of a manipulation target does not change on a touch screen even upon depressing the surface of the touch screen.

According to the present invention, the manipulation attributes such as a lever movement range and its position are limited, so that the information management section can perform proper manipulations in accordance with the gesture analyzed by the gesture analyzing section and the coordinate values from the position sensor within this range.

According to the present invention, the positions of only two fingers, i.e., the thumb and index finger, are detected to result in a lightweight arrangement, if any, thereby naturally and accurately performing manipulations at low cost.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a block diagram showing the arrangement of a virtual manipulating apparatus according to the first embodiment of the present invention;

FIGS. 6 through 8 are views showing gesture descriptions stored in a gesture description storage section shown in FIG. 3;

FIG. 11 is a block diagram showing the arrangement of a virtual manipulating apparatus according to the second embodiment of the present invention;

FIG. 12 is a detailed system diagram showing a manipulation attribute storage section 10, a simulator 12, an input section 11, and an information management section 1, all of which are shown in FIG. 11;

FIG. 13 is a flow chart showing the operation of the simulator 12 shown in FIGS. 11 and 12;

FIG. 14 is a view showing a screen displayed when an attribute is set to each manipulation target according to the second embodiment;

FIGS. 15A and 15B are views for inputting manipulation attributes while observing the screen shown in FIG. 14;

FIGS. 16A and 16B are views showing a position data file stored in the manipulation attribute storage section shown in FIG. 11;

FIG. 17 is a view showing an attribute data file stored in the manipulation attribute storage section;

FIG. 18 is a view showing an attribute relation data file stored in the manipulation attribute storage section;

FIG. 21 is a flow chart showing an operation for causing the information management section to retrieve a determined manipulation target object attribute from the manipulation attribute storage section;

FIG. 23A is a view showing a control panel displayed on the monitor screen, FIGS. 23B through 23F are views showing object data stored in the object attribute storage section, the object position storage section, the functional attribute table, the inter object relation storage section, and the object status storage section when a lamp 0 is turned on upon depression of a button 1 on the monitor screen, and FIG. 23G is a view showing a state wherein the lamp 0 is turned on upon depression of the button 1;

FIG. 25 is a flow chart showing an operation for causing an object determining section shown in FIG. 24 to set a target object; and FIG. 26 is a flow chart for causing an inter object relation setting section shown in FIG. 24 to set inter object relation data.

DETAILED DESCRIPTION OF THE PREFERRED EMBODIMENTS

Figure 1:
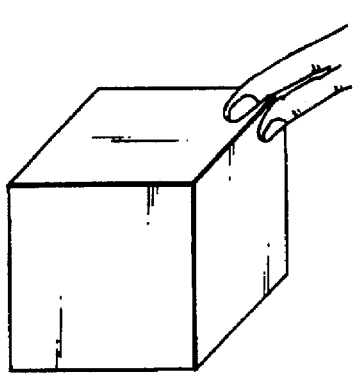
FIGS. 1 and 2 are views for explaining a non-grasped state and a grasped state so as to explain a conventional drawback.
Figure 2:
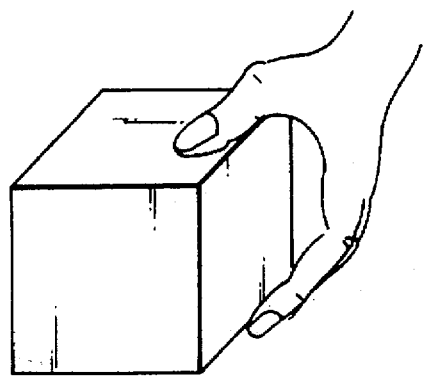

FIG. 3 is a block diagram showing a virtual manipulating apparatus according to an embodiment of the present invention. Referring to FIG. 3, a position source 7 generates a magnetic field for detecting finger positions (to be described later). Each position sensor 6 detects the magnetic field generated by the position source 7 to detect a three-dimensional position. Each position sensor 6 is mounted on each of the minimum number of fingers (a thumb 19 and an index finger 21 in this embodiment, as shown in FIG. 4)

required to perform manipulations of levers 14, buttons 13, a touch screen 15, and a slider 17. Note that a virtual hand 23 is displayed on the display section 5 shown in FIG. 4 although fingers actually used are only the thumb and the index finger. Pieces of position information detected by the position sensors 6 are transmitted by compact transmitting sections 8 arranged under the position sensors 6. In this embodiment, the position information is transmitted as a radio signal. However, the present invention is not limited to this. An arrangement for transmitting a signal through a wire as in the 3D Space Isotrack available from Polhemus or the Bird available from Ascension Technology may be employed. An operator manipulates the levers 14, the buttons 13, the touch screen 15, the slider 17, and the like serving as manipulation targets presented on the monitor of the display section 5 while observing them. The finger position information transmitted from the transmitting sections 8 in the form of radio signals is received by a receiving section 2. The information from the position source 7 and the information from the receiving section 2 are stored in a position data buffer 1a in the information management section 1. A gesture description storage section 4 stores various interpretation rules for determining gestures such as "Grasp", "Slide", "Point", "Touch", and "Release". A gesture analyzing section 3 retrieves an interpretation rule in the gesture description storage section 4 in accordance with an input condition from the information management section 1 to read out a rule coincident with the input condition. A 3D graphics data storage section 9 stores three-dimensional data associated with figures serving as manipulation targets. For example, the 3D graphics data storage section 9 stores, e.g., vertex coordinates, a color, a normal direction, and the like for a triangle.

Figures 4, 5:
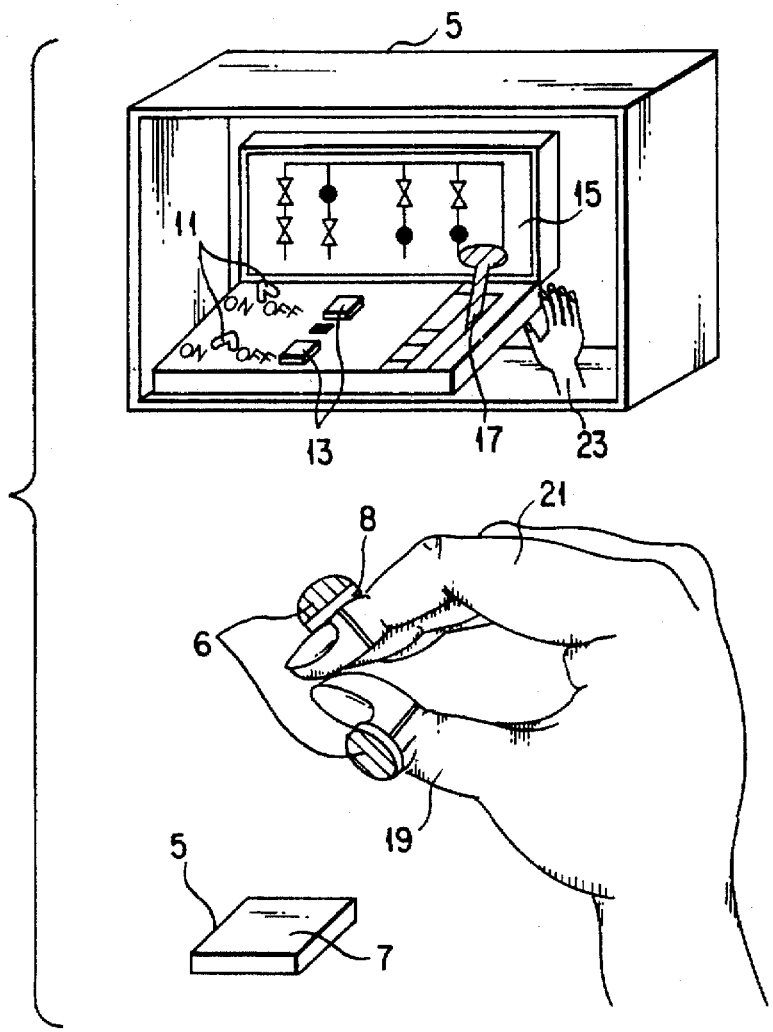
FIG. 4 is an enlarged view showing a display section 5, a transmitting section 8, a position sensor 6, and a position source 7, all of which are shown in FIG. 3.
FIG. 5 is a table showing position data received by a receiving section shown in FIG. 3.

The data transmitted by the transmitting section is arranged in a format shown in FIG. 5. The data receiving section 2 receives position information transmitted from the transmitting section and sends it to the information management section. As shown in FIG. 5, the position information is constituted by a sensor number (1,2) (1 represents a thumb and 2 represents an index finger) representing which position sensor transmits a signal, coordinate values (x1$t$, y1$t$,z1$t$) (where 1$t$ represents the value of sensor number 1 (thumb) at time t) in the three-dimensional space, and rotation angles ($\alpha$1$t$, $\beta$1$t$, $\gamma$1$t$) of the roll, pitch and yaw axes.

The information management section 1 synchronizes the position source 7 with the position sensors 6, if required. That is, when an AC magnetic field is generated by the position source 7, synchronization must be performed. However, when a DC magnetic field is used, no synchronization is required. If synchronization is required, the information management section 1 performs synchronization and sends calibrated data to the gesture analyzing section 3 together with an analysis execution instruction. The gesture analyzing section 3 analyzes a gesture on the basis of rules described in the gesture description storage section. The rules shown in FIGS. 6 through 8 are stored in the gesture description storage section. A descriptive language is, e.g., LISP.

Rule 1 is a rule for interpreting a gesture (Grasp) when fingers grasp the slider 17 or each lever 14. Rule 1 sets a gesture value h_gesture in "Grasp" when the following three conditions are satisfied.

Condition 1: Lt≦Δ1

That is, a distance Lt between sensor 1 (the position sensor 6 mounted on the thumb 19 in this case) and sensor 2 (the position sensor 6 mounted on the index finger 21 in this case) is equal to or smaller than a given value Δ1 (i.e., the thumb 19 is located at a position very close to the index finger 21). The distance Lt between sensors 1 and 2 is a square root of the sum of squares of the x-, y-, and z-coordinates.

| Condition 2: | h_gesture ≠ Grasp & h_gesture ≠ Slide |
| --- | --- |

That is, the previous gesture is not set in a "Grasp" or "Slide" state in which the slider or the like is being moved (i.e., the immediately preceding gesture does not represent that the fingers do not grasp or manipulate an object).

Condition 3: y2$t$>y1$t$

That is, the y-coordinate of sensor 2 is larger than the y-coordinate of sensor 1 (i.e., the index finger is located above the thumb).

Rule 2 is a rule for interpreting a gesture (Release) in which the fingers are separated from the grasped slider 17 or lever 14. Rule 2 sets a gesture value h_gesture in "Release" when the following two conditions are satisfied.

Condition 1: Lt<2Δ1

That is, a distance Lt between sensor 1 (the position sensor mounted on the thumb in this case) and sensor 2 (the position sensor mounted on the index finger in this case) is larger than a given value 2Δ1 (i.e., the thumb is spaced apart from the index finger twice the distance by which the thumb is located at the position very close to the index finger).

| Condition 2: | h_gesture == Grasp & h_gesture == Slide |
| --- | --- |

That is, the previous gesture is set in a "Grasp" or "Slide" state in which the slider 17 or the like is being moved (i.e., the immediately preceding gesture represents that the fingers grasp or manipulate an object).

Rule 3 is a rule for interpreting a gesture (Slide) in which the fingers grasp, move, and manipulate the slider 17 or the lever 14. Rule 3 sets a gesture value h_gesture in "Slide" when the following two conditions are satisfied.

Condition 1: Lt≦Δ1

That is, a distance Lt between sensor 1 (the position sensor mounted on the thumb in this case) and sensor 2 (the position sensor mounted on the index finger in this case) is equal to or smaller than a given value Δ1 (i.e., the thumb is located at a position very close to the index finger).

| Condition 2: | h_gesture == Grasp & h_gesture == Slide |
| --- | --- |

That is, the previous gesture is set in a "Grasp" or "Slide" state in which the slider 17 or the like is being moved (i.e., the immediately preceding gesture represents that the fingers grasp or manipulate an object).

Rule 4 is a rule for restoring an initial value (Neutral) after the fingers releases (Release) the lever 14 or the slider 17. Rule 4 sets a gesture value h_gesture in "Neutral" when the following two conditions are satisfied.

Condition 1: Lt>Δ2

That is, a distance Lt between sensor 1 (the position sensor mounted on the thumb in this case) and sensor 2 (the position sensor mounted on the index finger in this case) is larger than a given value Δ2 (i.e., the thumb is sufficiently spaced apart from the index finger).

Condition 2: h_gesture==Release

That is, the previous gesture is set in the "Release" state (i.e., the immediately preceding gesture is set in the release state).

Rule 5 is a rule for interpreting a gesture (Point) for pointing a direction. Rule 5 sets a gesture value h_gesture in "Point" when the following three conditions are satisfied.

Condition 1: Lt>2Δ1

That is, a distance Lt between sensor 1 (the position sensor mounted on the thumb in this case) and sensor 2 (the position sensor mounted on the index finger in this case) is larger than a given value 2Δ1 (i.e., the thumb is spaced apart from the index finger twice the distance by which the thumb is located at the position very close to the index finger).

Condition 2: $|\sin\theta| \leq \Delta 1$

That is, an angle θ between the thumb and the index finger is close to 90°. The angles α, β, and γ about the x-, y-, and z-axes, detected by the position sensors are converted into a quatanion qi, and a normal vector di of this quatanion is calculated. The sum of internal products of this normal vector is defined as sinθ.

Condition 3: y2t>y1t

That is, the y-coordinate of sensor 2 is larger than the y-coordinate of sensor 1 (i.e., the index finger is located above the thumb).

Rule 6 is a rule for restoring the initial state (Neutral) from the gesture (Point) for pointing a direction. Rule 6 sets a gesture value h_gesture in "Neutral" when the following two conditions are satisfied.

Condition 1: Lt<2Δ1

That is, a distance Lt between sensor 1 (the position sensor mounted on the thumb in this case) and sensor 2 (the position sensor mounted on the index finger in this case) is smaller than a given value 2Δ1 (i.e., the thumb is not spaced apart from the index finger twice the distance by which the thumb is located at the position very close to the index finger).

Condition 2: h_gesture==Point

That is, the previous state is a pointing (Point) state.

Rule 7 is a rule for interpreting a gesture (Touch) in which the fingers come into touch with a button or screen. Rule 7 sets a gesture value h_gesture in "Touch" when the following two conditions are satisfied.

Condition 1: L2t<Δ1

That is, a distance L2t between sensor 2 (the position sensor mounted on the index finger in this case) and the display is sufficiently smaller than a given value Δ1 (i.e., the index finger is very close to the display). L2t is obtained by the x-, y-, and z-coordinates of the index finger and the x-, y-, and z-coordinates of the display.

| Condition 2: | h_gesture == Point |
|---|---|
| | h_gesture == Touch |

That is, the previous state represents pointing (Point) or touching (Touch) (i.e., the fingers come close to the display by a pointing gesture or come in touch with the display).

Rule 8 is a rule for restoring the initial value (Neutral) from a gesture (Touch) in which the fingers are in contact with a button or screen. Rule 8 sets a gesture value h_gesture in "Neutral" when the following two conditions are satisfied.

Condition 1: L2t>2Δ1

That is, a distance L2t between sensor 2 (the position sensor mounted on the index finger in this case) and the display is sufficiently larger than a given value 2Δ1 (i.e., the index finger is sufficiently away from the display).

Condition 2: h_gesture==Touch

That is, the previous state is touching (Touch) (i.e., the previous state is that the fingers are kept in contact with a button or screen).

Gestures to be interpreted except for the "Grasp", "Slide", "Point", "Touch", and "Release" shown in FIGS. 6 through 8 can also be defined by describing shapes of both the thumb and the index fingers.

The 3D graphics data storage section 9 stores three-dimensional graphics data as of the levers 14, the buttons 13, the touch screen 15, and the slider 17.

The operation of the embodiment shown in FIG. 3 will be described below.

Figure 9:
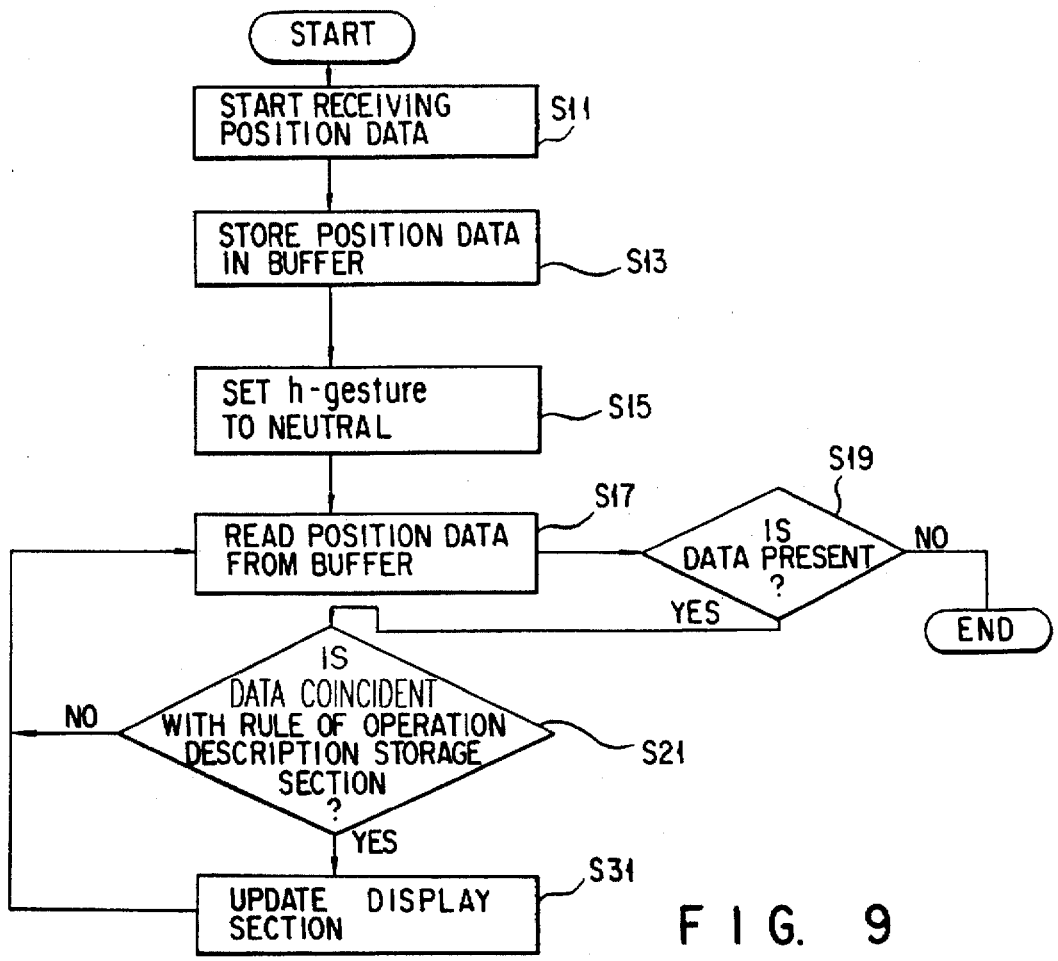
FIG. 9 is a flow chart showing an operation of an information management section shown in FIG. 3.
Figure 10:
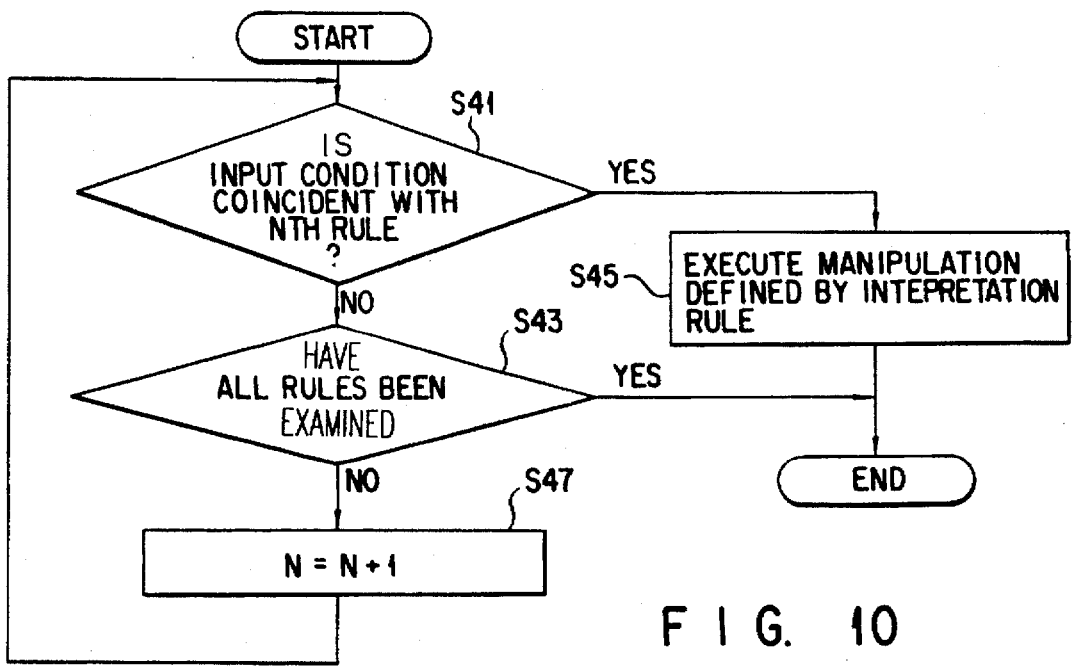
FIG. 10 is a flow chart showing an operation of a gesture analyzing section shown in FIG. 3.

FIG. 9 is a flow chart showing the operation of FIG. 3. The information management section 1 starts analysis in accordance with an operation start instruction. The position data (FIG. 5) sent from the position sensors 6 are received by the receiving section 2 (step S11). The information management section 1 comprises the position data buffer 1a and a display controller 1b shown in FIG. 3 and stores the position data in the position data buffer 1a (step S13). As one of the initialization operations of the position data buffer 1a, a parameter h_gesture representing a gesture of a hand 23 is set in "Neutral" (i.e., a status value which represents no gesture) (step S15). The gesture analyzing section 3 then reads out the position data stored in the position data buffer 1a (steps S17 and S19). As shown in the flow chart (FIG. 10) of the gesture analyzing section 3, the gesture analyzing section 3 determines in step S41 whether an input condition is coincident with a rule N (the initial value of N is 1) stored in the gesture description storage section 4. If YES in step S41, a manipulation defined by this interpretation rule is executed in step S45. If NO in step S41, N is incremented by one to determine whether the input condition is coincident with the next rule. Steps S41, S43, and S47 are repeated until all the rules are checked. In FIG. 9, it is then checked in step S21 on the basis of the readout present position data and the gesture value h_gesture of the present hand 23 whether the present condition is coincident with any of the rules (FIGS. 6 through 8) stored in the gesture description storage section 4. If YES in step S21, the h_gesture value is updated on the rules described in the gesture description storage section 4. If NO in step S21, the h_gesture value is not updated. The h_gesture value analyzed by the gesture analyzing section 3 is not updated. The positions of the sliders 17, the buttons 13, and the lever 14, and the like presented on the display section 5 under the control of the display controller in the information management section 1 are updated in accordance with the manipulation contents using the h_gesture value analyzed by the gesture analyzing section 3 and the position data (step S31). Note that the shapes (characters) of the slider, the buttons, and the levers are read out from the 3D graphic data storage section 9 under the control of the display controller and are presented on the display section 5.

As described above, according to this embodiment, each gesture is interpreted in accordance with a relationship between the position on the display and the positions of the thumb and index finger. Therefore, natural manipulations can be performed with a simple arrangement.

FIG. 11 is a block diagram showing the second embodiment of the present invention. In addition to the arrangement of the first embodiment, there are also added an attribute storage section 10 for storing a manipulation attribute (lever movable in the vertical direction or a lever movable back and forth) in addition to the three-dimensional shape of a target presented on the display section 5, and an input section 11 and a simulator 12 which latter two sections are used to present the manipulation attribute. The simulator 12 simulates the internal process of a manipulation target stored in the 3D graphic data storage section 9.

In the first embodiment, the manipulation attributes of the manipulation targets such as levers and buttons are not limited. When a manipulation target on the display section 5 is to be moved by a gesture interpreted by the positions of an index finger and a thumb, a lever supposed to be moved in only the vertical direction may be obliquely moved due to detection errors of the position sensors. For this reason, in the second embodiment, manipulation attributes of manipulation targets are set in advance to cover the above position detection errors, thereby providing accurate manipulations.

FIG. 12 is a system diagram showing a practical arrangement of the simulator 12, the input section 11, and the manipulation attribute storage section 10. Referring to FIG. 12, a workstation 25 corresponds to the information management section 1, the manipulation attribute storage section 10, the 3D graphic data storage section 9, the gesture description storage section 4, and the gesture analyzing section 3, all of which are shown in FIG. 11. A workstation 27 in FIG. 12 corresponds to the simulator 12 in FIG. 11. In the arrangement shown in FIG. 11, a magnetic field from a position source is detected by position sensors 6, and the detection signals are transmitted as radio signals from transmitting sections 8 to a receiving section 2. In the arrangement of FIG. 12, detection signals are input from position sensors 6 to the workstation 25 through a receiving section 29 via cables. The position information from each position sensor 6 may be input to the information management section 1 (workstation 25) through a radio unit or cables. The workstation 25 is connected to the workstation 27 on the basis of TCP/IP communication specifications. The workstation 25 is connected to the receiving section 29 in accordance with RS232C interface specifications. The workstation 25 is connected to a keyboard 31 and a mouse 33, both of which constitute the input section 11. The workstation 27 simulates an accidental phenomenon or the internal state of a training target system associated with the accidental phenomenon. More specifically, in step S51 of FIG. 13, the simulator 12 performs normal operation processing. In step S53, an accidental or malfunction case to be trained is instructed. The simulator 12 sets parameters for the inferred malfunction case. In step S57, inferred malfunction processing is performed. It is determined in step S59 whether the state is restored to the normal operation. If NO in step S59, step S57 is executed again. If YES in step S59, the flow returns to step S51.

FIG. 14 shows a screen when attributes are set to the respective manipulation targets.

The upper right portion indicates an outline shape menu A. A user selects the shape from this menu. In this embodiment, a large rectangle "rect1" 20, a small rectangle "rect2" 21, and an arrow "arrow1" 22 are exemplified.

An arbitrary object is interpreted from the menu A in the upper right portion with a pointing device (e.g., a mouse) in the input section 11 and is arranged at an appropriate position B in the lower right portion. These operations are repeated to locate manipulation targets represented on the display section 5.

Manipulation attributes are then set to the arranged targets. As shown in FIGS. 15A and 15B, manipulation attributes are set as follows. The mode is selected with the "N" key to set a new attribute. A target to which an attribute is set is selected from a lower right screen B (FIG. 14) with the mouse 33, and an attribute is selected. As shown in FIG. 17, attributes to be instructed are, e.g., attribute types (i.e., lever 0, button 1, and panel 2 in this case).

Attributes to be set for a lever are a rotating shaft, the number of gears, a gear position range, the center of the gear position, and types of sounds generated when the gears are engaged.

Attributes to be set for a button are a coordinate position, color, and sound in the ON state, a color in the OFF state, and an attribute for a panel is a color in the ON/OFF state.

After the attributes are instructed as described above, attribute data types are added in the attribute storage section 10 in addition to the shape data types shown in FIGS. 16A and 16B. The actually added contents are shown in FIG. 17.

Attribute data are not only added, but also deleted, copied, referred to, as shown in FIGS. 15A and 15B. The manipulation results are written in a file with the "W" key for instructing write access to a file.

In addition to the manipulation attributes, when a given button is manipulated, a parent-child relationship of a manipulation object associated with another button can also be instructed with the manipulation of the given button. In this embodiment, as shown in FIGS. 15A and 15B, a parent can have children as many as possible (i.e., the number of objects which change in a subordinate relationship is not limited), but a child can have only one parent (the number of parents which influence the manipulations is only one). This parent-child relationship is stored in the attribute storage section 10 in a form shown in FIG. 18. During setting the manipulation attributes, a present parent-child relationship is shown in a lower left screen C, as shown in FIG. 14.

More specifically, a system used as a virtual trainer has the simulator 12 for simulating an accidental phenomenon and the internal state of a training object system associated with the accidental phenomenon. Since the movable ranges of manipulation targets such as the lever 14 and the button 13 are predetermined, the ranges are stored as manipulatable attributes in the attribute storage section 10 together with three-dimensional CG data for display on the display section 5. The information management section 1 transmits a manipulation instruction interpreted by the gesture analyzing section 3 to the simulator 12. Information management such as display of the arithmetic operation result of the simulator to the display section 5 is performed. In addition, to improve interpretation efficiency and its accuracy, the gesture description storage section 4 is arranged such that the rules are described on the basis of the detected thumb and index finger positions, the position of the display section 5, and the manipulation attributes stored in the manipulation attribute storage section 10, thereby interpreting a manipulation instruction.

Determination of an object serving as a manipulation target will be described below.

Figure 19:
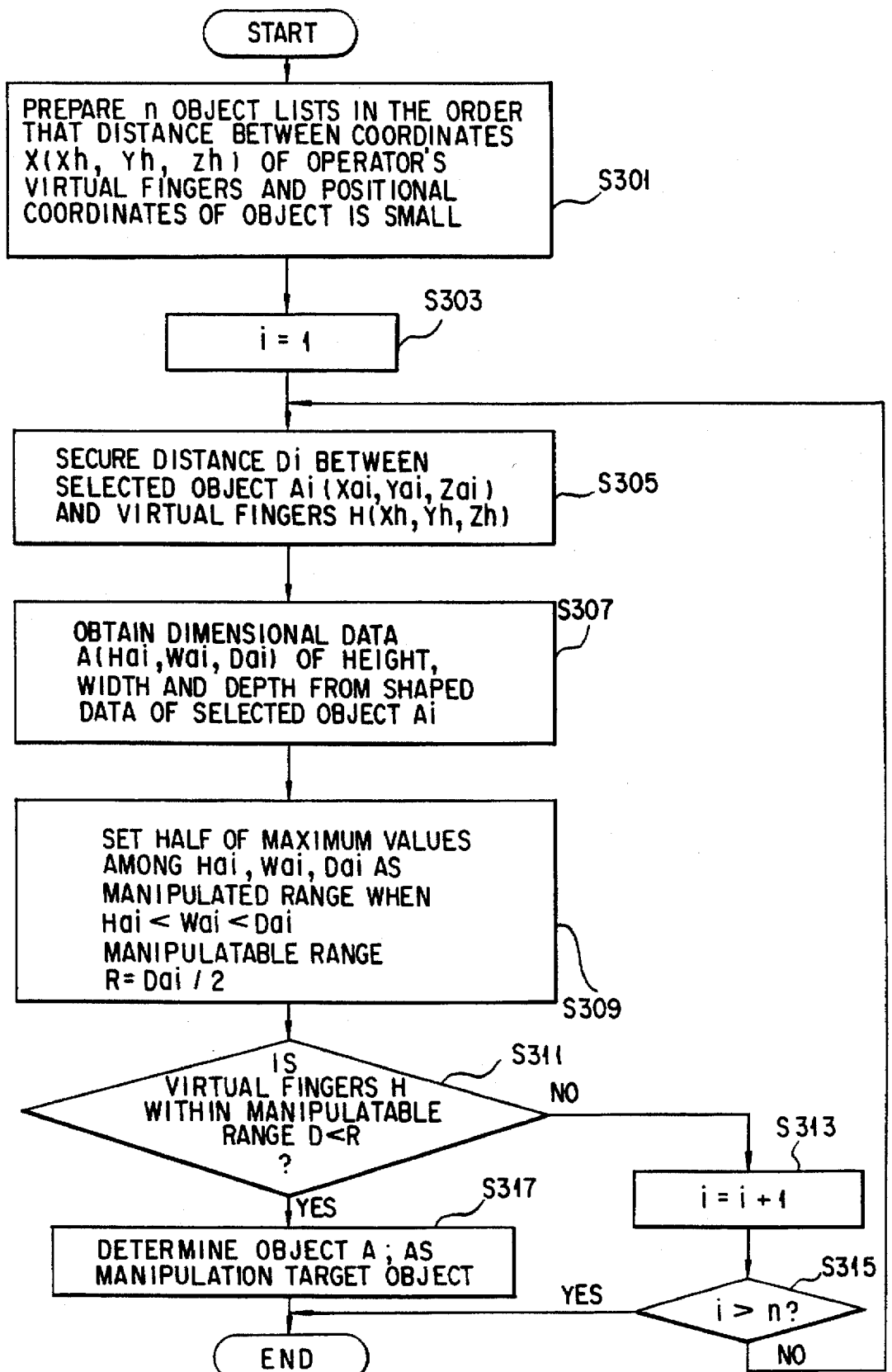
FIG. 19 is a flow chart showing an operation for causing the information management section to determine a manipulation target object.

The information management section 1 searches an object closest from the finger coordinates in the virtual space, sets an object manipulatable range around this object, and determines whether the operator's fingers fall within this range. This determination flow is shown in FIG. 19.

Figure 20:
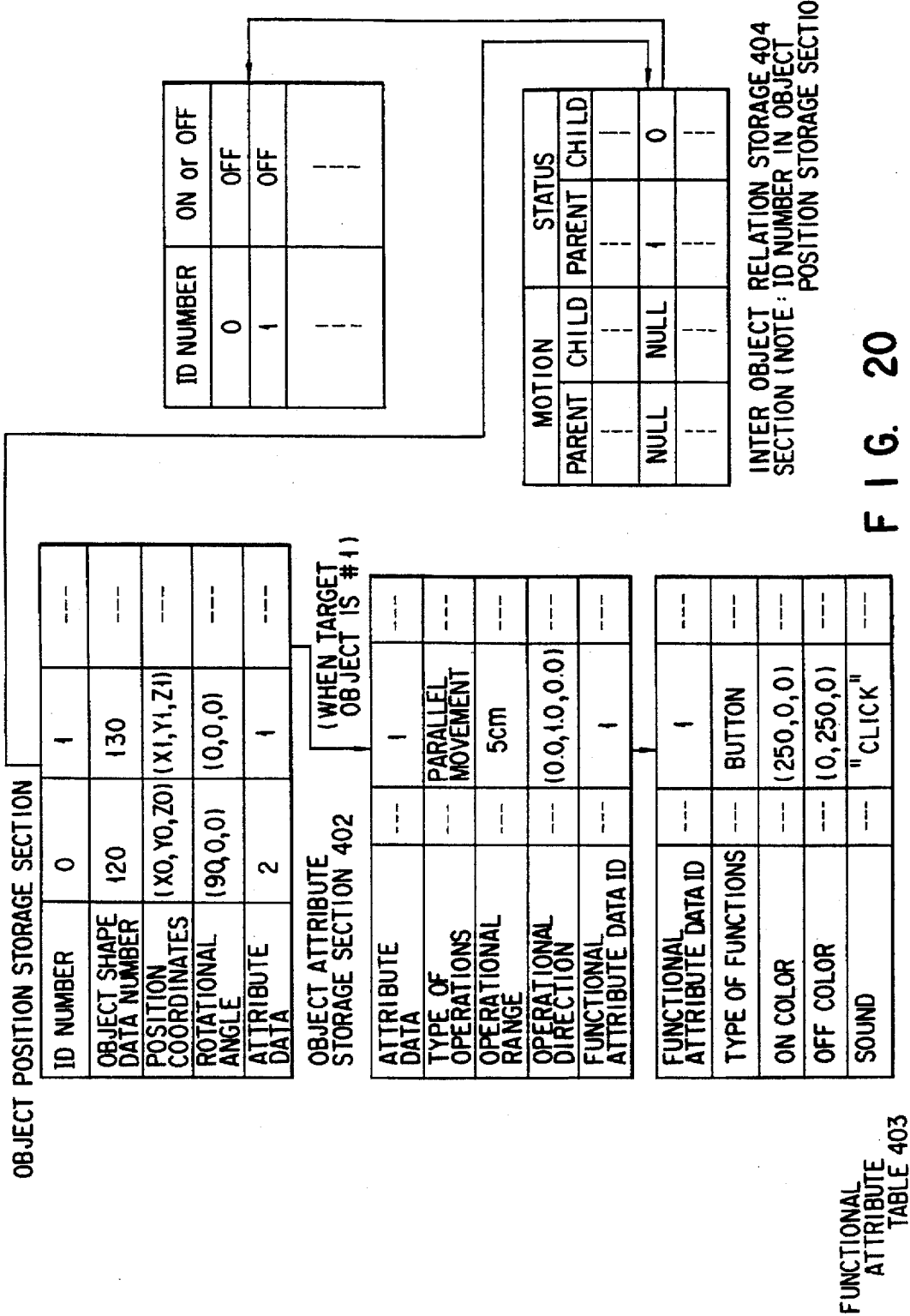
FIG. 20 is a view showing internal data in an object attribute storage section, an inter object relation storage section, an object status storage section, and an object position storage section.
Figure 22:
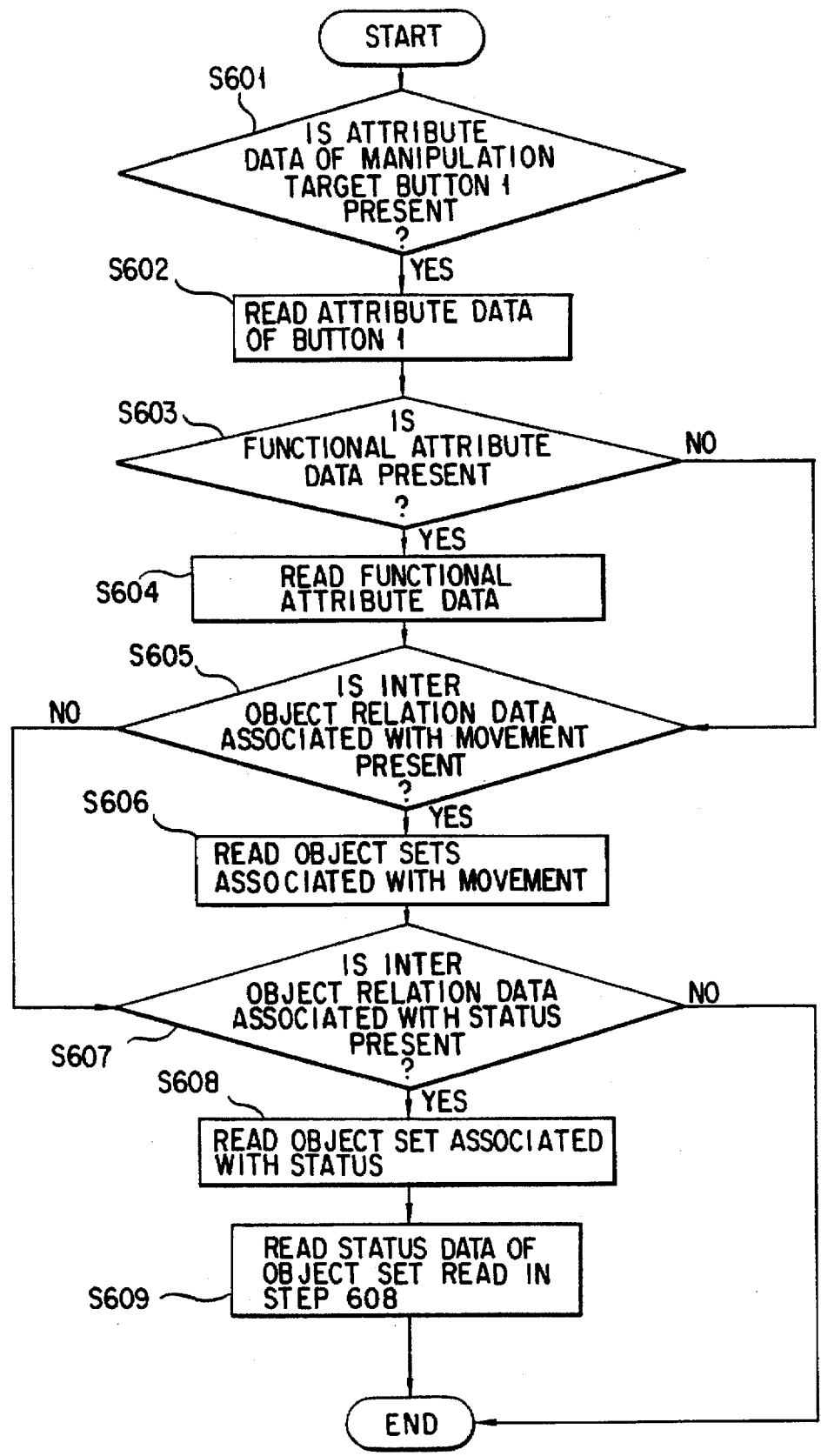
FIG. 22 is a flow chart showing an operation for retrieving an attribute for a button as a manipulation target from the attribute storage section in the object data retrieval flow chart in FIG. 21.

The information management section 1 has an object attribute storage section 402 for storing attribute data of each object, an inter object relation storage section 404 for storing inter object relation data defining a relationship between the objects, an object status storage section 405 for storing status data of each object, a 3D graphics data storage section 9 for storing object shape data, and an object position storage section 401 for storing position coordinate data of each object in the three-dimensional virtual space. The internal data in the object attribute storage section 402, the inter object relation storage section 404, the object status storage section 405, and the object position storage section 401 are shown in FIG. 20.

The object position storage section 401 stores an ID number and attribute data of each object. Attribute data is searched using an ID number. Movement enable/disable data and limitations on movement and rotation of each object are stored in the object attribute storage section 402. The object attribute storage section 402 has each specific functional attribute table 403 as a subordinate structure. For example, an ON color upon depression of a button, an OFF color, a type of sound generated upon depression of a button, and the like are set. The inter object relation storage section 404 stores a parent-child relation associated with motion, and a parent-child relation associated with status upon setting an object ID number. The object status storage section 405 stores data for determining whether an object having a function as the button is currently set in an ON or OFF state and changing the status in accordance with an input operation.

In determination of a manipulation target object, at the start of the apparatus, n object lists are prepared in the order that a distance i between the coordinates X(Xh,Yh,Zh) of the operator's virtual fingers and the position or positional coordinates of the object is small (step S301). To prepare the first object list, the initial value is set to i=1 (step S303). In step S305, a distance Di between the selected object Ai(Xai, Yai,Zai) and the virtual fingers H(Xh,Yh,Zh) is secured. Dimensional data A(Hai,Wai,Dai) of height, width, and depth is obtained from the shaped data of the selected object Ai (step S307). The half of maximum values among Hai, Wai, Dai is set as a manipulated range for the object Ai. If Hai<Wai<Dai, then a manipulatable range is set to R=Dai/2 (step S309). It is determined in step S311 whether the virtual fingers H fall within the manipulatable range (D<R). If YES in step S311, the object Ai is determined as a manipulation target object (step S317), thereby ending the target object determination operation. If NO in step S311, i is incremented by one in step S313. It is then determined in step S315 whether i is larger than n. If YES in step S315, the target object determination operation is ended; otherwise, the flow returns to step S305 to repeat the operations in steps S305 through S317.

When the manipulation target object is determined, object data is retrieved in accordance with an object data retrieval flow in FIG. 21. More specifically, the information management section 1 retrieves attribute data of the object selected as the manipulation target from the object attribute storage section 402 (S501) to determine the limitations of the operations of this object (S502). If functional attribute data is set in this attribute data, the functional attribute data is also retrieved (S503) and determined (S504). When the attribute data is set for the manipulation target object, the inter object relation storage section 404 is accessed to determine whether a relation between this object and other objects is established (S505 and S507), and this relation is determined (S506 and S508). When a status relation is set, associated object status data is retrieved in the object status storage section 405 (S509). On the basis of an input manipulation, the object status storage section 405 is updated. Image update processing contents are determined on the basis of a series of object data determined as described above. A three-dimensional image is generated and displayed on the display section 5 on the basis of the image update processing contents.

Manipulations for depressing buttons will be described with reference to FIGS. 22 and 23A through 23G.

The operator inputs the physical coordinates of a finger position and its direction through the corresponding position sensor 6. Assume that the operator stretches the index finger to depress button #1. The manipulation contents are determined as "depression of an object" by the gesture analyzing section 3. The information management section 1 retrieves the nearest object on the basis of the physical coordinates of the operator's finger and the object position storage section 401 and determines button #1 as the manipulation target object. When attribute data of button #1 is retrieved from the object attribute storage section 402 (step S601), button #1 has attribute data No. 1. Button #1 can be moved parallel within the range of 5 cm, and the direction (vector) of movement is determined as (x,y,z)=(0.0,1.0,0.0) (step S602). It is found that button #1 has functional attribute set data No. 1. As a result of further retrieval (step S603), the attribute settings as the button functions of button #1 are determined such that RGB values (color palette value: 0–255) of the ON or OFF color and the types ("click") of sounds generated upon depression of button #1 are set (step S604). A relation between button #1 and other objects is determined on the basis of information of the inter object relation storage section 404 (steps S605, S606, S607, and S608). Button #1 is determined not to be a parent in accordance with inter object relation data associated with motion, and button #1 can be moved parallel. It is thus found that no object interlocked with movement of button #1 is present (step S606). Button #1 is found to be a parent in accordance with the inter object relation data associated with status, and button #1 has lamp #0 as a child (step S608). Status data of button #1 and lamp #0 are retrieved in the object status storage section 405 in accordance with the inter object relation of the previous status, and button #1 and lamp #0 are determined to be currently in the OFF state. The status data of button #1 and #0 are changed from the OFF state to the ON state on the basis of the input manipulation contents as the "depression of the object" (step S609). If the object status is not defined by a binary value as an ON or OFF state, but by a ternary value, the object status is sequentially changed. The contents of the image update processing are determined from the respective data of the object and displayed on the display section 5.

According to the method of the above embodiment, the operator can manipulate an object by ordinary actions such as grasping and pushing with fingers in the real world. In response to an input manipulation, an object is operated within the limited operational range using the attribute data of the object, and the associated objects can also be interlockingly operated. Therefore, interactive manipulations as in the real world can be performed in the virtual world.

An object manipulating apparatus according to the third embodiment will be described with reference to FIGS. 24 and 25. According to the third embodiment, an object data setting means for setting and editing each object data, i.e., position data, attribute data, inter object relation data, and object initial status data is added to the second embodiment.

Figure 24:
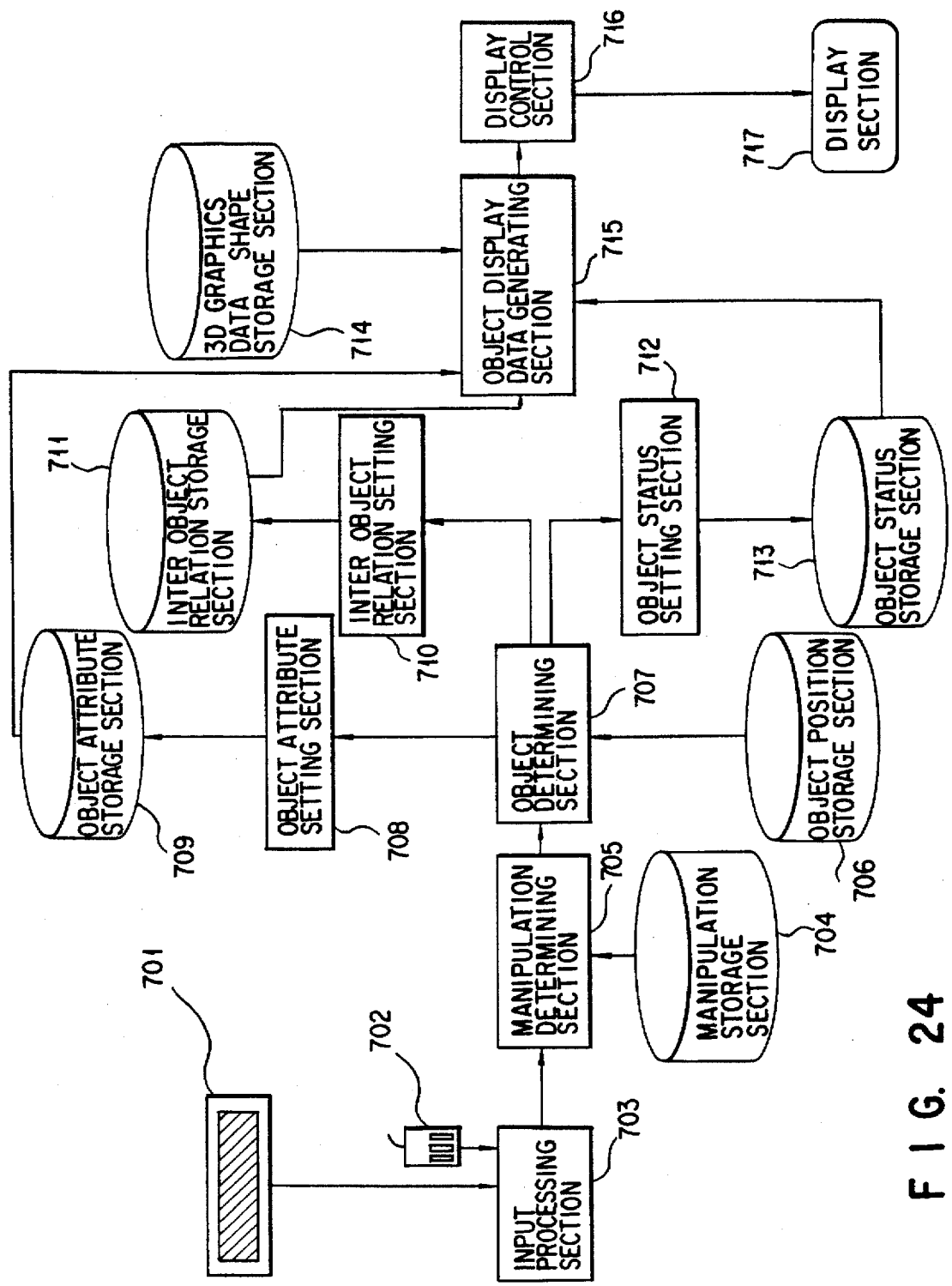
FIG. 24 is a detailed block diagram of a 3D graphic data storage section, a display control section, and the display section all of which are shown in FIG. 3, and of a manipulation attribute storage section, a 3D graphics data storage section, and the information management section, all of which are shown in FIG. 11.

The arrangement of the object manipulating apparatus of the third embodiment shown in FIG. 24 comprises input devices such as a keyboard 701 and a pointing device (e.g., a mouse 702), and an input processing section 703 for detecting the manipulated states of the input devices. The input processing section 703 is connected to a manipulation storage section 704 and a manipulation determining section 705. The manipulation storage section 704 stores object tables between the states of the keyboard 701 and the mouse 702 operated by the operator and the manipulation contents of the respective manipulations. The manipulation determining section 705 determines the manipulation contents of the operator's manipulations with reference to the object tables. The manipulation determining section 705 is connected to an object determining section 707 together with an object position storage section 706 for storing object position data in the three-dimensional virtual world. The object determining section 707 determines a target object on the basis of inputs from the object position storage section 706 and the mouse 702. That is, the object determining section 707 converts three-dimensional coordinate values into two-dimensional coordinate values on the screen, compares the two-dimensional coordinate values with the coordinates of the mouse 702, and selects the nearest object.

The object determining section 707 is also connected to an object attribute setting section 708 for setting object attribute data and an inter object relation setting section 710 for setting inter object relation data. The object attribute setting section 708 is connected to an object attribute storage section 709 for storing set attribute data. The inter object relation setting section 710 is connected to an inter object relation storage section 711 for storing set relation data. The object determining section 707 is connected to an object status setting section 712 for setting object initial data. This object status setting section 712 is connected to an object status storage section 713 for storing set initial status data.

A 3D graphics data storage section 714 for storing object shape data is connected to an object display data generating section 715 together with the object attribute storage section 709, the inter object relation storage section 711, and the object shape storage section 713. The object display data generating section 715 generates display object data for a two-dimensional image on the basis of the 3D graphics data storage section 714, and the object attribute storage section 709, the object shape storage section 713, and the inter object relation storage section 711, which latter three are set by the object attribute setting section 708. A display control section 716 for generating the two-dimensional image on the basis of the result from the object display data generating section 715 is connected to a display section 717 for image display.

An operation of the object manipulating apparatus having the above arrangement according to the third embodiment will be described below.

The input processing section 703 detects the manipulated state of the keyboard 701 or the mouse 702, and the manipulation determining section 705 determines the manipulation contents of the detection result on the basis of the data from the manipulation storage section 704. If the manipulation contents represent data for setting attribute data, inter object relation data, or initial state data, the object determining section 707 obtains three-dimensional coordinate values from the object position storage section 706 (step S801) and determines a projected plane (step S802). The object determining section 707 converts three-dimensional position data into two-dimensional plane coordinates of the screen (step S803) and retrieves an object nearest to the position pointed with the mouse 702 on the basis of the two-dimensional plane coordinates and the position data of the mouse 702 which is sent from the input processing section 703 (step S804). It is determined whether the retrieved object falls within the selectable range (step S805). If YES in step S805, this retrieved object is determined as a target object (step S806).

Each data is set in any of the object attribute setting section 708, the inter object relation setting section 710, and the object status setting section 712 on the basis of an input by the operator. The set data are respectively stored in the object attribute storage section 709, the inter object relation storage section 711, and the object status storage section 713. The object display data generating section 715 generates display data for displaying a two-dimensional image on the basis of the set results and the data from the 3D graphics data storage section 714. The display control section 716 generates the two-dimensional image on the basis of the display data, and the two-dimensional image is displayed on the display section 717.

An operation for setting inter object relation data will be described with reference to FIG. 26.

FIG. 26 shows a manipulation screen on which inter object relation data is set by the object data setting means. An object selection menu is displayed on the uppermost portion of the screen. In this example, objects are "panel", "sofa", "crt", "screen projector", "frame", "dial", and the like. The operator can picks up an object with the mouse 702 in the virtual world displayed in a simplified two-dimensional diagram shown in the lower right portion of the screen. A parent-child relation between the objects can be set in such a manner that an inter object relation data setting mode is selected with a menu button in the upper portion of the screen, an object which will serve as a parent is picked with the left mouse button, and an object which will serve as a child is picked up with the middle button of the mouse. The ID numbers of these selected objects are stored and set in the inter object relation storage section 711. The contents of the stored data are displayed in the left portion of the screen. The objects whose data have been set are displayed in a color different from nonselected objects. In FIG. 26, the color of objects Nos. 1, 2, and 3 is displayed in a color different from that of the remaining objects.

According to the method of the third embodiment described above, the operator assumes a specific operation of a specific object and edits the data to set and update operations within the three-dimensional virtual world without creating a program. For this reason, anyone can set data if he knows data description rules. In addition, attribute data is stored independently of other data. For this reason, when several objects have similar attributes, one attribute data may be shared by the objects, thereby reducing the memory capacity.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A virtual manipulating apparatus, comprising:
   presentation means for presenting a manipulation target in a three-dimensional virtual space using three-dimensional computer graphics;
   position detecting means for detecting a finger tip position of an operator, including:
   a position source for generating a magnetic field;

position sensors, mounted on a tip of a thumb and a tip of an index finger of the operator, for detecting the magnetic field from said position source;

transmitting means, mounted on the tip of the thumb and the tip of the index finger for transmitting position information from said position sensors; and receiving means for receiving the position information sent from said transmitting means;

interpreting means for interpreting a manipulation instruction, using prescribed rules, on the basis of a relation between the position of the finger tip which is detected by said position detecting means and the position of the manipulation target on the presentation means.

2. The apparatus according to claim 1, wherein the position detecting means detects positions of a thumb tip and an index finger tip.

3. An apparatus according to claim 1, wherein the manipulation instruction includes "Grasp", "Slide", "Point", "Touch" and "Release".

4. An apparatus according to claim 1, wherein said transmitting means transmit the position information to said receiving means through a radio unit.

5. An apparatus according to claim 1, wherein said transmitting means transmit the position information to said receiving means through cables.

6. A virtual manipulating apparatus comprising:

presentation means for presenting a manipulation target;

simulator means for simulating internal processing of the manipulation target presented on said presentation means;

manipulation storage means for storing a manipulation attribute of each manipulation target together with graphic data presented on said presentation means;

position detecting means for detecting a finger tip position of an operator, including:
  a position source for generating a magnetic field;
  position sensors, mounted on a tip of a thumb and a tip of an index finger of the operator, for detecting the magnetic field from said position source;
  transmitting means, mounted on the tip of the thumb and the tip of the index finger, for transmitting position information from said position sensors; and
  receiving means for receiving the position information sent from said transmitting means;

interpreting means for interpreting a manipulation instruction for said presentation means on the basis of a relation between the finger tip position detected by said position detecting means, a position of said presentation means, and the manipulation attribute stored in said manipulation attribute storage means; and information management means for performing control to transmit the manipulation instruction interpreted by said interpreting means to said simulator means and present a result of the manipulation instruction on said presentation means.

7. An apparatus according to claim 6, wherein the manipulation instruction includes "Grasp", "Slide", "Point" "Touch" and "Release".

8. An apparatus according to claim 6, wherein said transmitting means transmit the position information to said receiving means through a radio unit.

9. An apparatus according to claim 6, wherein said transmitting means transmits the position information to said receiving means through cables.

10. An apparatus according to claim 6, wherein said presentation means comprises object attribute data storage means for storing position data of an object in a three-dimensional virtual space generated by computer graphics;

object status data storage means for storing initial status data of each object;

inter object relation data storage means for storing inter object parent-child relation data;

means for generating a three-dimensional image in the virtual space on the basis of the position data, the initial status data, and the inter object parent-child relation data;

display means for displaying the three-dimensional image, and input means used to enter input information for manipulating each object; and said interpreting means comprises:

object determining means for determining a target object from the data input from said input means, and updating means for updating the status data or a display on said display means so as to correspond to a manipulation input by said input means, on the basis of the attribute data, the status data, and the relation data which are determined by said object determining means.

11. An apparatus according to claim 10, further comprising object data setting means for setting and editing each of the object position data, the attribute data, the inter object relation data, the object initial state data.

12. An apparatus according to claim 11, further comprising means for reflecting a result set and updated by said object data setting means to said generating means in real time, thereby displaying and updating the result.

* * * * *